US008213415B2

(12) United States Patent
Hiroki

(10) Patent No.: US 8,213,415 B2
(45) Date of Patent: Jul. 3, 2012

(54) COMMUNICATION APPARATUS, METHOD OF CONTROLLING THE COMMUNICATION APPARATUS, AND COMMUNICATION SYSTEM

(75) Inventor: Shigeru Hiroki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 688 days.

(21) Appl. No.: 11/469,997

(22) Filed: Sep. 5, 2006

(65) Prior Publication Data

US 2007/0067503 A1     Mar. 22, 2007

(30) Foreign Application Priority Data

Sep. 21, 2005   (JP) .................................. 2005-273715

(51) Int. Cl.
*H04L 12/66* (2006.01)
*G06F 15/16* (2006.01)

(52) U.S. Cl. ........................................ 370/352; 709/228

(58) Field of Classification Search .................. 370/352, 370/401; 380/270; 709/228, 237; 455/420, 455/436, 552.1; 710/15
See application file for complete search history.

(56) References Cited

U.S. PATENT DOCUMENTS

| | | | | |
|---|---|---|---|---|
| 7,222,235 | B1 * | 5/2007 | Mitsui ............................. | 713/176 |
| 7,310,664 | B1 * | 12/2007 | Merchant et al. .............. | 709/220 |
| 7,426,564 | B2 * | 9/2008 | Yoshida et al. ................ | 709/228 |
| 2002/0147819 | A1 * | 10/2002 | Miyakoshi et al. ............ | 709/228 |
| 2003/0210331 | A1 * | 11/2003 | Battles et al. ................. | 348/211.2 |
| 2003/0212768 | A1 * | 11/2003 | Sullivan ......................... | 709/220 |
| 2004/0224642 | A1 * | 11/2004 | Kim et al. ...................... | 455/74.1 |
| 2004/0229606 | A1 * | 11/2004 | Oshima et al. ................ | 455/426.2 |
| 2005/0007617 | A1 * | 1/2005 | Tanaka et al. ................ | 358/1.13 |
| 2005/0036034 | A1 * | 2/2005 | Rea et al. ...................... | 348/207.1 |
| 2005/0146608 | A1 * | 7/2005 | Yosida et al. ................. | 348/207.1 |
| 2005/0272420 | A1 * | 12/2005 | Matsuda et al. .............. | 455/426.2 |
| 2006/0033812 | A1 * | 2/2006 | Yoshida et al. ............... | 348/14.01 |
| 2006/0034253 | A1 * | 2/2006 | Yurugi et al. ................. | 370/352 |
| 2006/0068803 | A1 * | 3/2006 | Kajimoto ....................... | 455/452.2 |
| 2006/0105714 | A1 * | 5/2006 | Hall et al. ..................... | 455/41.3 |
| 2006/0111097 | A1 * | 5/2006 | Fujii .............................. | 455/420 |
| 2006/0153384 | A1 * | 7/2006 | Bhesania et al. ............. | 380/270 |
| 2006/0206592 | A1 * | 9/2006 | Fujii et al. ..................... | 709/220 |
| 2007/0036358 | A1 * | 2/2007 | Nguyen et al. ................ | 380/270 |

FOREIGN PATENT DOCUMENTS

| | | | |
|---|---|---|---|
| JP | 2002-312155 | A | 10/2002 |
| JP | 2002-359623 | A | 12/2002 |
| JP | 2004-030280 | A | 1/2004 |
| JP | 2004328288 | A * | 11/2004 |
| JP | 2005236828 | A * | 9/2005 |

* cited by examiner

*Primary Examiner* — Ayaz Sheikh
*Assistant Examiner* — Hoang-Chuong Vu
(74) *Attorney, Agent, or Firm* — Canon U.S.A., Inc. I. P. Division

(57) ABSTRACT

A method and system for establishing communication between communication apparatuses, including a first communication apparatus receiving, from another communication apparatus, first information used for communication by a first communication unit via a second communication unit, detecting a transfer of second information, and depending on the detection result, determining whether to use the first information for the communication by the first communication unit.

8 Claims, 5 Drawing Sheets

COMMUNICATION APPARATUS, METHOD OF CONTROLLING THE COMMUNICATION APPARATUS, AND COMMUNICATION SYSTEM

BACKGROUND OF THE INVENTION

1. Field of the Invention

The present invention relates to a communication apparatus, a method of controlling the communication apparatus, and a communication system.

2. Description of the Related Art

In recent years, various devices equipped with a wireless communication function such as a 802.11 wireless LAN have been developed and introduced into the market. When a wireless LAN is used in the communication, it is necessary to set the following communication parameters in a device.

Network identifier (ESSID)
Authentication method (NONE/WPA-PSK/WPA-RADIUS)
User ID and Password
Cryptosystem (NONE/WEP/TKIP/AES)
Cryptographic key
Operation mode (Adhoc/Infra)

In general, such communication parameters are set via the device's user interface. However, the setting operation can be troublesome for a user, especially, in devices other than personal computers (hereinafter, referred to as PC) such as digital cameras or printers where it is not easy to input a character string such as a network identifier (ESSID) or a cryptographic key.

Further, when communication parameters are set in a device other than a PC, a PC and the device are connected to each other and the communication parameters are set using the PC's user interface. However, the method of setting communication parameters by connecting a PC cannot be used in an environment where there is no PC.

Accordingly, in recent years, techniques have been proposed in which devices wirelessly communicating with each other are directly connected by a cable and the setting is carried out by transmitting wireless communication parameters of one device to another device (for example, see U.S. Patent Application Publication No. 2002/0147819 A1 and Japanese Patent Application Laid-open No. 2002-312155).

In the setting method in which devices are directly connected to each other, parameters sent from one device are automatically set in another device. Accordingly, even if the user does not intend, the communication parameters can be set in the device receiving the communication parameters.

For example, a digital camera can be connected to a printer via a USB cable. In this case, wireless communication parameters stored in the printer in advance are automatically sent to the digital camera, and thus, wireless communication parameter setting in the digital camera is carried out.

Further, when an image in a digital camera is printed, the digital camera and a printer are typically temporarily connected via a cable, such as USB. In some instances, the digital camera belongs to one wireless network while the printer belongs to a different wireless network.

In this case, although digital camera and printer are connected via the USB cable for the purpose of transferring the image, wireless communication parameters set in the printer are also set in the digital camera. Accordingly, existing wireless communication parameters in the digital camera can be replaced by the wireless communication parameters of the printer during this temporary wired connection.

SUMMARY OF THE INVENTION

The present invention is seen to address the above described problem of unintended transferring of communication parameters from one device to another device.

According to an aspect of the present invention, a communication apparatus is provided which includes a first communication unit, a second communication unit, a receiver unit configured to receive, from at least one other communication apparatus via the second communication unit, a first information used for communication by the first communication unit, a detector unit configured to detect initiation or completion of a transfer of a second information, a decider unit configured to determine, based on a detection result by the detector unit, whether to use the first information for communication by the first communication unit, and an instruction unit configured to instruct whether to use the first information for communication by the first communication unit based on the results of the decider unit.

According to yet another aspect of the present invention, a method of controlling a communication apparatus including a first communication unit and a second communication unit includes receiving information, from at least one other communication apparatus via the second communication unit, used for communication by the first communication unit, and determining, based on detection of an initiation or completion of a transfer of information, whether to use the received information.

Another aspect of the present invention is directed to a system for establishing communication between communication apparatuses, each having a first communication unit and a second communication unit, the system including a first communication apparatus including a transmitter configured to send a first information used for communication by a first communication unit to the second communication apparatus via a second communication unit, and a second communication apparatus including a receiver configured to receive the first information from the first communication apparatus via the second communication unit, a detector configured to detect an initiation or completion of a transfer of a second information, a decider configured to determine, based on a detection result by the detector, whether to use the first information for the communication by a first communication unit, depending on the detection result by the detector, and an instructor configured to instruct whether to use the first information for communication by the first communication unit based on the results of the decider.

Further aspects and features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate numerous embodiments, features and aspects of the invention and, together with the description, serve to explain the principles of the invention.

DETAILED DESCRIPTION OF THE EMBODIMENTS

Various embodiments, features and aspects of the present invention will now be herein described in detail below with reference to the drawings.

First Exemplary Embodiment

Figure 1:
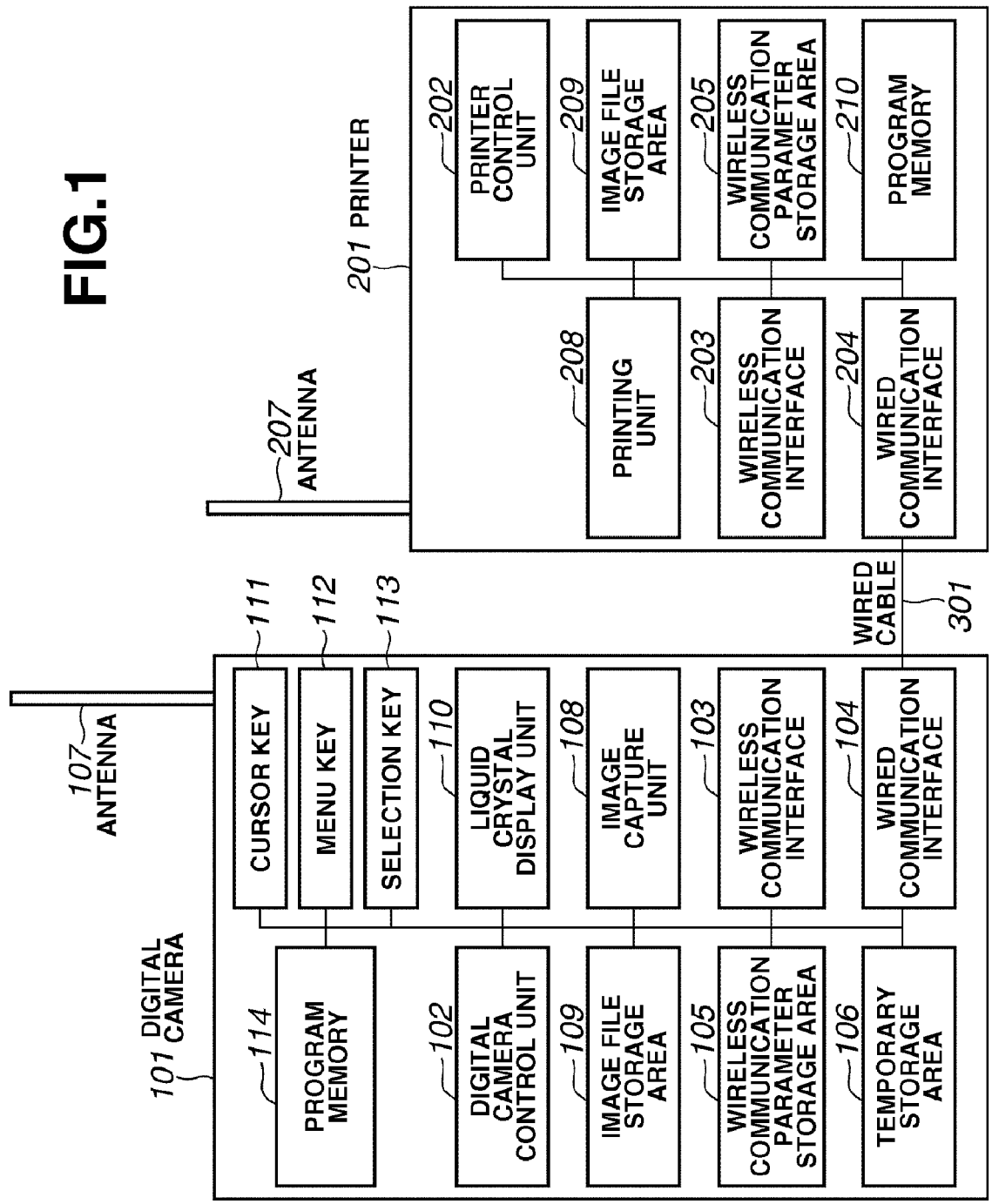
FIG. 1 illustrates a block diagram of a communication parameter setting system according to a first exemplary embodiment of the present invention.

FIG. 1 illustrates a block diagram of a communication parameter setting system according to a first exemplary embodiment of the present invention. The communication parameter setting system according to a first exemplary embodiment includes a digital camera 101 and a printer 201, where the digital camera 101 and a printer 201 are connected via a wired cable 301 such as a USB cable.

Reference numeral 102 denotes a digital camera control unit, reference numeral 103 denotes a wireless communication interface on the side of the digital camera 101, and reference numeral 104 denotes a wired communication interface on the side of digital camera 101. A wireless communication parameter storage area 105 stores communication parameters which are used when a wireless communication is carried out using the wireless communication interface 103. A temporary storage area 106 temporarily stores wireless communication parameters which are stored on the wireless communication parameter storage area 105.

Reference numeral 107 denotes an antenna on the side of the digital camera 101, an image capture unit 108 captures an image, an image file storage area 109 stores the image captured by the image capture unit 108. Reference numeral 110 denotes a liquid crystal display unit, reference numeral 111 denotes a cursor key, reference numeral 112 denotes a menu key, and reference numeral 113 denotes a selection key. A program memory 114 stores programs which are executed when the digital camera control unit 102 carries out various controls. That is, the program memory 114 stores an operation program for carrying out the operation shown in FIG. 2 which is described below.

Reference numeral 202 denotes a printer control unit, reference numeral 203 denotes a wireless communication interface on the side of the printer 201, and reference numeral 204 denotes a wired communication interface on the side of the printer 201. A wireless communication parameter storage area 205 stores communication parameters which are used when a wireless communication is carried out through the wireless communication interface 203.

Reference numeral 207 denotes an antenna on the side of the printer 201, reference numeral 208 denotes a printing unit, and reference numeral 209 denotes an image file storage area for storing an image file to be printed. A program memory 210 stores programs which are executed when the printer control unit 202 carries out various controls. That is, the program memory 210 stores an operation program for carrying out the operation shown in FIG. 3 which is described below.

In this exemplary embodiment, the wireless communication parameters of the printer 201 are set in advance by some means. For example, when the printer is manufactured. However, wireless communication parameters that are used when the digital camera 101 is connected to the printer 201, are not set. In order to enable the digital camera 101 to wirelessly communicate with the printer 201, the wireless communication parameters are set after receiving wireless communication parameters from the printer 201 via the wired cable 301. Further, when the digital camera 101 and the printer 201 are connected via the wired cable 301, the wireless communication parameters are automatically transferred from the printer 201 to the digital camera 101.

Figure 2:
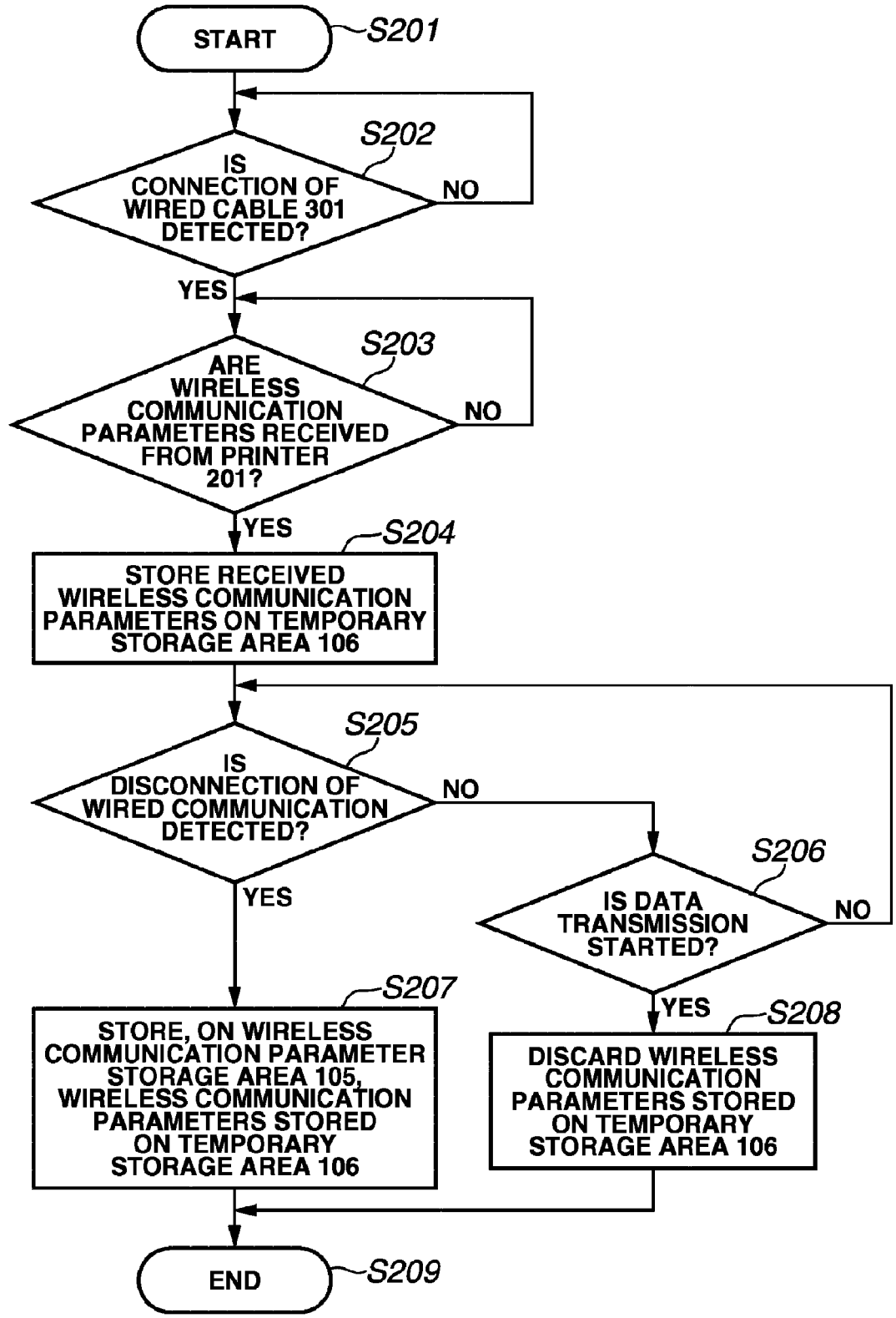
FIG. 2 is a flowchart illustrating operation of a digital camera according to the first exemplary embodiment of the present invention.

FIG. 2 is a flowchart illustrating operation of the digital camera 101 according to the first exemplary embodiment of the present invention.

Figure 3:
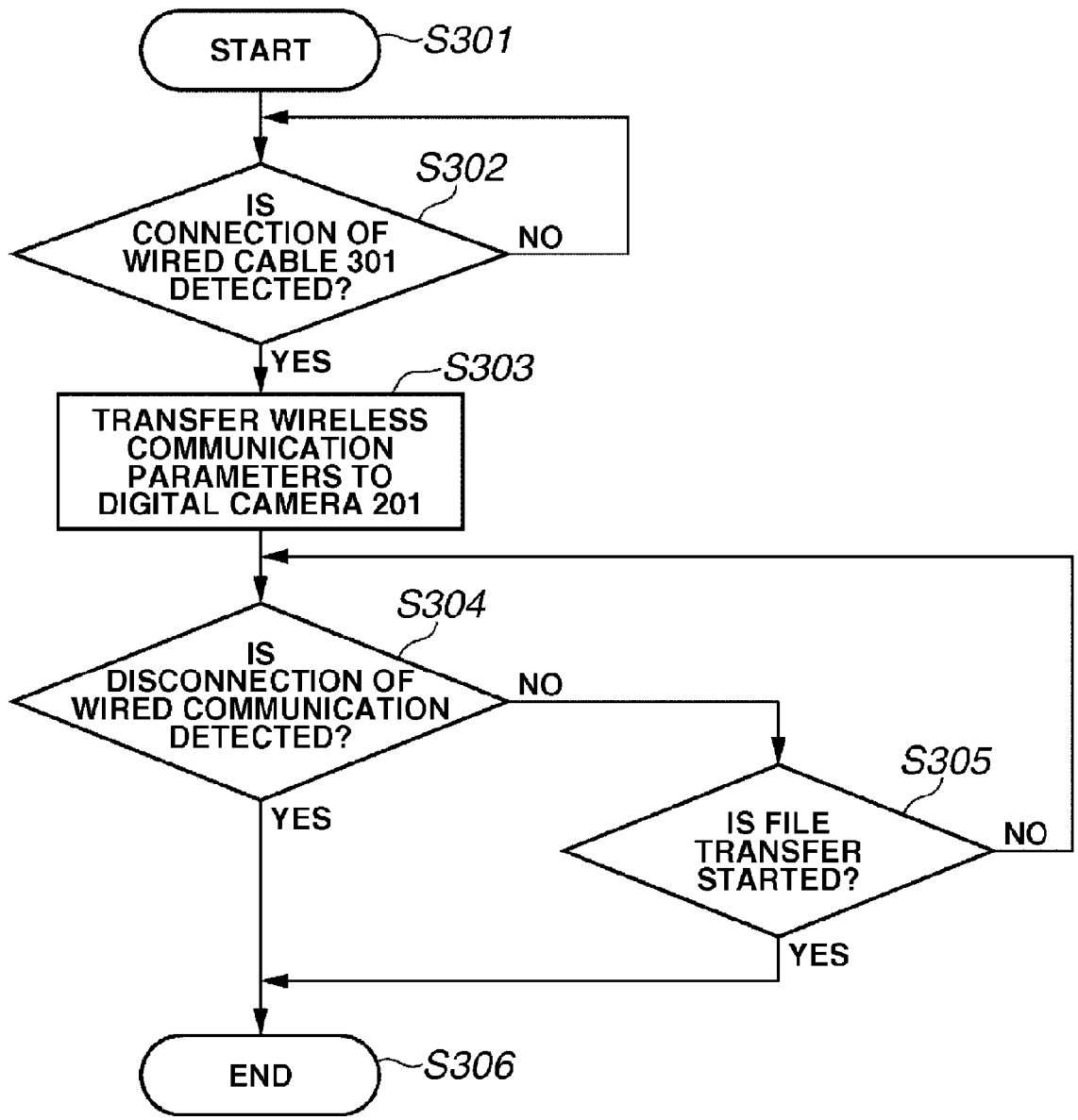
FIG. 3 is a flowchart illustrating operation of a printer according to the first exemplary embodiment of the present invention.

FIG. 3 is a flowchart illustrating operation of the printer 201 according to the first exemplary embodiment of the present invention.

When wireless communication parameters of the digital camera 101 are set, the digital camera 101 and the printer 201 are connected with each other via the wired cable 301, and after a predetermined period of time, the wired cable 301 is disconnected. Operation of the digital camera 101 and the printer 201 is described below in the case where the above-described work is carried out.

Turning to FIG. 2, after the operation begins at step S201, in step S202, a check is made whether the digital camera 101 detects a connection of the wired cable 301. If the digital camera 101 detects a connection of the wired cable 301, flow proceeds to step S203, where the digital camera 101 waits to receive wireless communication parameters from the printer 201.

Turning to FIG. 3, after the operation begins in step S301, a check is made in step S203 whether the printer 201 detects the connection of the wired cable 301. If the printer 201 detects the connection of the wired cable 301, then in step S303, the printer 201 sends wireless communication parameters stored in the wireless communication parameter storage area 205 to the digital camera 101.

Returning to FIG. 2, when the digital camera 101 receives the wireless communication parameters from the printer 201 in step S203, flow proceeds to step S204, where the digital camera 101 stores the received wireless communication parameters in the temporary storage area 106. Then, in step S205, a determination is made whether a disconnection of the wired communication, for example by the wired cable 301 disconnecting from either the printer 201 or the digital camera 101, has occurred.

If the wired communication is determined to be disconnected, then flow proceeds to step S207, where the wireless communication parameters stored in the temporary storage area 106 are stored in the wireless communication parameter storage area 105. Then, the wireless communication parameters which have been set in the printer 201 in advance are also set in the digital camera 101 so that the printer 201 and the digital camera 101 are wirelessly connected with each other.

Turning to FIG. 3, after the printer 201 transfers the wireless communication parameters to the digital camera 101 in step S303, a determination is made in step S304 whether the wired cable 301 has been disconnected. If the wired cable 301 has been disconnected, flow proceeds to step S306 where the processing ends.

By carrying out the above-described operation, the wireless communication parameters stored in the wireless communication parameter storage area 205 of the printer 201 are stored in the wireless communication parameter storage area 105 of the digital camera 101. As a result, the same communication parameters are set in both the digital camera 101 and the printer 201, and a wireless communication can be carried out via the wireless communication interfaces 103 and 203.

Next, a case is described in which an image file captured by the image capture unit 108 of the digital camera 101 and stored in the image file storage area 109 is printed by the printing unit 208 of the printer 201 via the wired cable 301.

First, a user connects the digital camera 101 and the printer 201 via the wired cable 301. Then, by operating the cursor key 111, the menu key 112, and the selection key 113, the user designates an image file, depicted on liquid crystal display 110, and provides an instruction to print the image. The designated image file is subsequently transferred to and printed by the printer 201.

Figure 4:
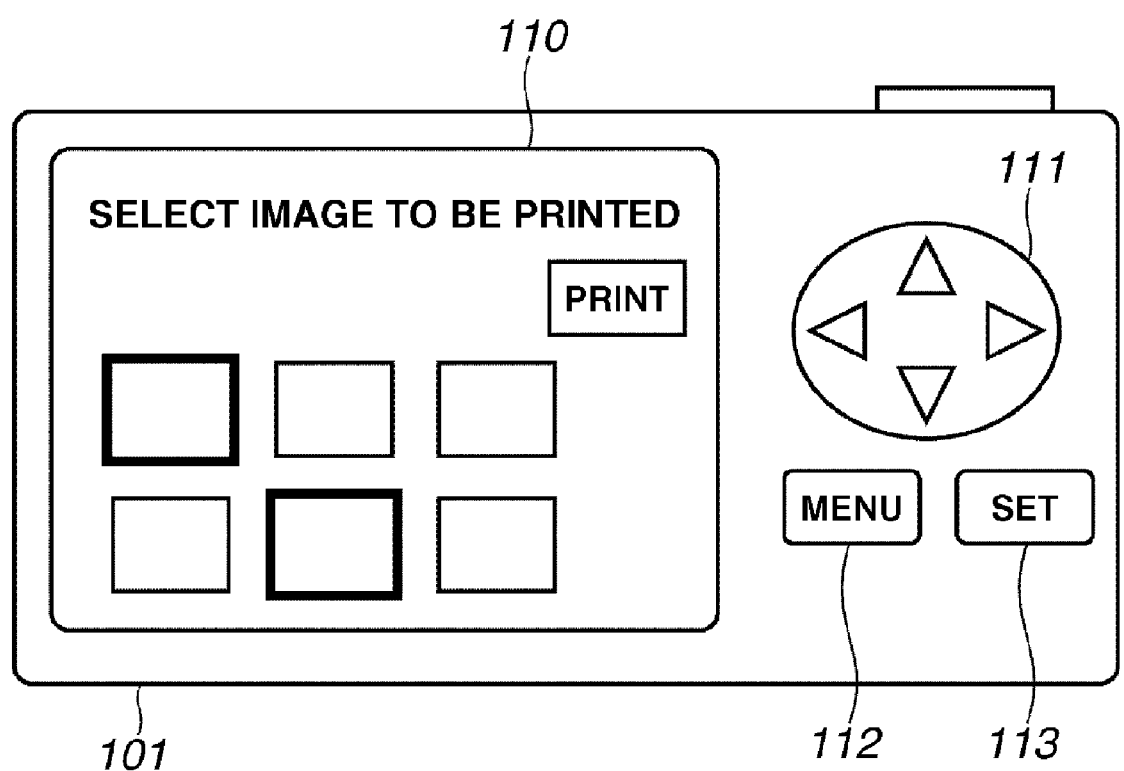
FIG. 4 is a view illustrating an example of a user interface in a case of instructing to designate an image file and to perform printing.

FIG. 4 depicts an example of a user interface used in the case where an image file is designated and the instruction is provided to print the image file.

More specifically, the user moves a cursor to an image, displayed on the liquid crystal display 110, to be printed using the cursor key 111 and designates the image file by depressing the selection key 113. After the image file is designated, the user moves the cursor using the cursor key 111 to characters which indicate "print", and instructs printing of the image by depressing the selection key 113. The operation of the digital camera 101 and the printer 201 is described below in the case where the above-described work is carried out.

Returning to FIG. 2, as described above, when the digital camera 101 detects the connection of the wired cable 301 in step S202, flow proceeds to step S203, where the digital camera 101 waits to receive wireless communication parameters from the printer 201.

Turning to FIG. 3, as described above, when the printer 201 detects the connection of the wired cable 301 in step S302, flow proceeds to step 303, where the printer 201 sends the wireless communication parameters stored in the wireless communication parameter storage area 205 to the digital camera 101.

Next, in FIG. 2, in step S203, when the digital camera 101 receives the wireless communication parameters from the printer 201, flow proceeds to step S204, where it stores the received wireless communication parameters in the temporary storage area 106. After a determination is made in step S205 that wired cable 301 has not been disconnected, flow proceeds to step S206, where a determination is made whether a file transfer has been carried out in response to the print instruction provided by the user.

If it is determined in step S206 that a data transmission has been initiated, flow proceeds to step S208, where the digital camera 101 discards the wireless communication parameters stored in the temporary storage area 106. In step S206, it can be alternatively determined whether depression of the print instruction button or completion of the file transfer is detected.

Next, in FIG. 3, after the wireless communication parameters are transferred to the digital camera 101 in step S303, and a determination is made in step S304 that the wireless cable 301 has not been disconnected, flow proceeds to step S305. In step S305, it is determined whether a file transfer has begun. If a file transfer has been detected, the printer 201 completes the processing. Then, the transferred file is printed.

According to the above-described operation, in the case where the printer 201 and the digital camera 101 are connected by the wired cable 301 for the purpose of printing the image file, the wireless communication parameters are not set.

According to this exemplary embodiment, in the case where the printer 201 and the digital camera 101 are connected by the wired cable 301 to set the wireless communication parameters, the parameters can be easily set. Further, in the case where the printer 201 and the digital camera 101 are connected by the wired cable 301 to transfer the image, automatic setting of the wireless communication parameters can be prevented.

Thus, according to this exemplary embodiment, the wireless communication parameters can be easily set and the setting of the wireless communication parameters, which is not intended by a user, can be prevented.

Second Exemplary Embodiment

In the first exemplary embodiment, when the image file transfer is detected, the digital camera 101 discards the wireless communication parameters stored in the temporary storage area 106.

In a second exemplary embodiment, the parameters are not immediately discarded, but stored as they are. Then, a message is displayed prompting a user to make a determination whether to use the parameters.

The block diagram of a communication parameter setting system and an operation flowchart of the printer 201 according to the second exemplary embodiment are similar to those shown in FIGS. 1 and 3. Thus, their descriptions are omitted herein.

Figure 5:
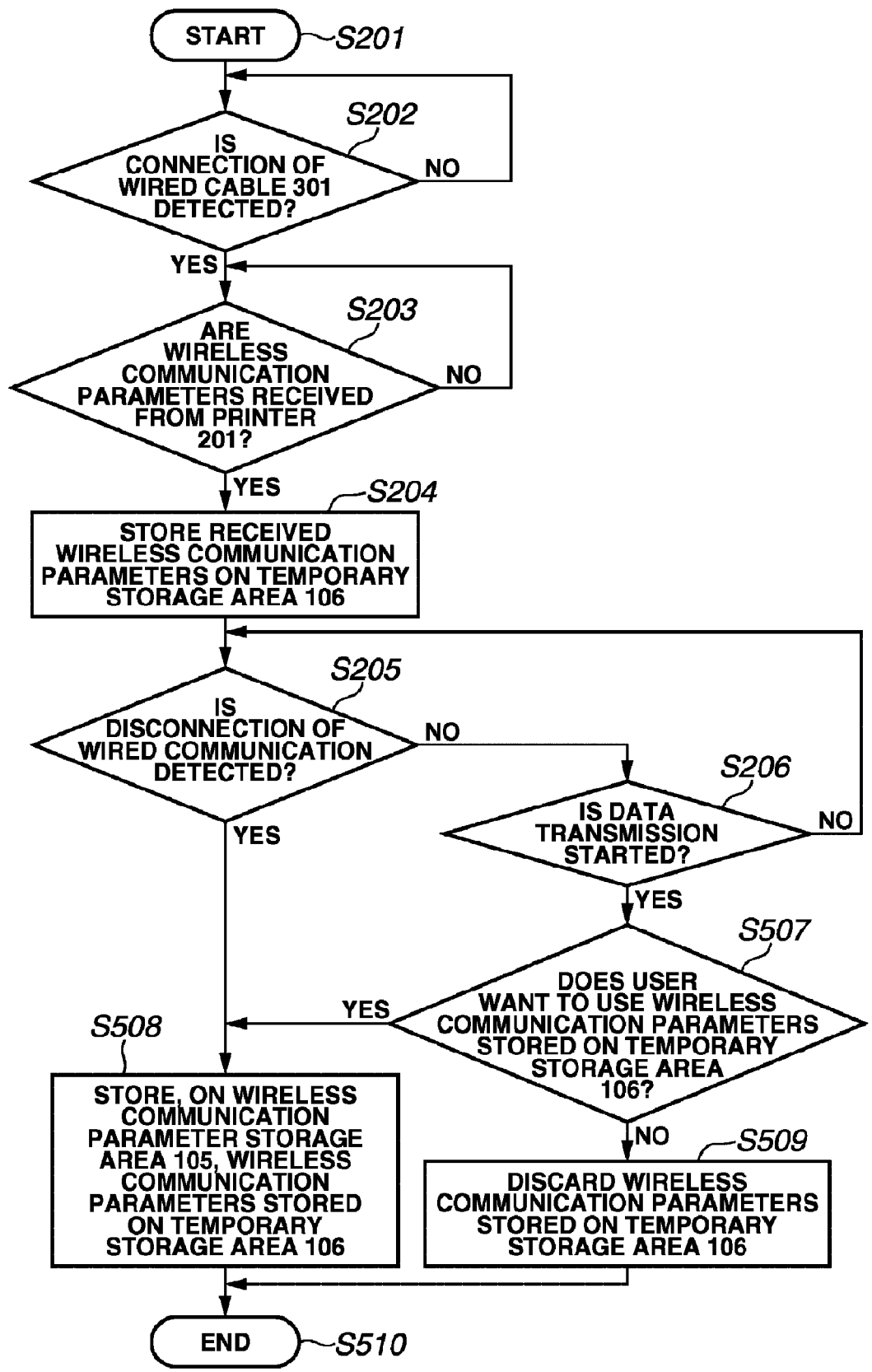
FIG. 5 is a flowchart illustrating operation of a digital camera according to a second exemplary embodiment of the present invention.

The operation flowchart of the digital camera 101 according to the second exemplary embodiment is shown in FIG. 5. Steps S201 through S206 of FIG. 5 are similar to those in FIG. 2, and thus detailed descriptions thereof are omitted herein. The operation depicted in FIG. 5 is carried out by a program stored in the program memory 114 of the digital camera 101.

When the digital camera 101, in step S205, detects that the wired communication is disconnected, flow proceeds to step S508, where the digital camera 101 stores the parameters which are stored in the temporary storage area 106 in the wireless communication parameter storage area 105. Thus, the wireless communication parameters set in the printer 201 in advance are also set in the digital camera 101, and the printer 201 and the digital camera 101 are wirelessly connected with each other.

If it is determined in step S205 that the wired connection is not disconnected and if it is determined in step S206 that the data transmission has started, flow proceeds to step S507 where the digital camera 101 displays a message prompting a user to decide whether to use the wireless communication parameters stored in the temporary storage area 106.

If the user selects to use the parameters, then in step S508, the wireless communication parameters stored in the temporary storage area 106 is stored in the wireless communication parameter storage area 105. Thus, the wireless communication parameters set in the printer 201 in advance are also set in the digital camera 101, and the digital camera 101 can wirelessly communicate with the printer 201.

If, in step 507, the user decides not to use the parameters, the wireless communication parameters stored in the temporary storage area 106 are discarded in step S509, and the processing ends in step S510.

In the second exemplary embodiment, the temporarily stored wireless communication parameters are not automatically discarded when the data transmission is started. Accordingly, after the image is printed by temporarily using the wired cable, the wireless connection can be continuously carried out using the wireless communication parameters sent from the printer.

Further, according to the second exemplary embodiment, in step S507, if the determination is not to use the parameters which are stored in the temporary storage area 106, the wireless communication parameters are discarded. However, the wireless communication parameters need not necessarily be discarded. For example, the parameters sent from a device which has been connected by wired connection can be stored without being discarded. If the parameters can be selected by a user's subsequent operation, when a wireless connection is required, desired parameters can be selected.

In the above exemplary embodiments, the case is described where the wireless communication parameters are stored on the printer 201. The printer 201 and the digital camera 101, which does not store the communication parameters, are connected via the wired cable 301 so that the communication parameters are transmitted. On the other hand, if the wireless communication parameters are stored on the digital camera 101 and the printer's 201 wireless communication parameters are set by receiving the parameters from the digital camera 101, a similar effect can also be obtained by similar operation. In this case, the above-described processing carried out by the digital camera 101 (FIGS. 2 and 5) is carried out by the printer 201, while the processing carried out by the printer 201 (FIG. 3) is carried out by the digital camera 101. Then, in step S206 in FIG. 2 or FIG. 5, it is determined whether the printer 201 received the data from the digital camera 101.

Further, the above exemplary embodiments describe a case where the wireless communication parameters are sent before an image file is transferred. However, the image file transfer can be carried out before the wireless communication parameters are sent. For example, the present invention can be applied to a system in which an image to be printed is selected on the digital camera 101 before the digital camera 101 is connected by a wired cable 301 to the printer 201. Upon completion of the connection, the image is transferred to the printer 201 at the same time.

Further, in the above-described exemplary embodiments, the actual wireless communication parameters are sent from the printer 201 to the digital camera 101. However, instead of sending the actual parameters, a part of the wireless communication parameters or information that is a key to setting the wireless communication parameters can be sent. This results in a reduction in the amount of transmission data as compared with transmitting the actual wireless communication parameters.

The information that is the key to setting the wireless communication parameters is information subjected to a calculation process to generate the wireless communication parameters. For example, in one method, an algorithm for generating the same wireless communication parameters is loaded in advance in both the printer 201 and the digital camera 101, and the algorithm generates the same wireless communication parameters in each device using the received key information. Further, another method, a network identifier (SSID) is represented by a manufacturer's name plus an identification number. When the manufacturer is the same, if only the identification information, for example "0034", is sent, a network identifier (ESSID) is generated.

In the above-described exemplary embodiments, the wired communication method need not to be specified. Any wired communication method, such as USB, IEEE1394, Ethernet, etc. that would enable practice of the present invention would be applicable. Moreover, the present invention is not limited to wired communication connections, and any type of non-wired communication connection, such as infrared data communication or NFC (Near Field Communication), that would enable practice of the present invention are applicable. In the case of a non-wired communication environment, detection of connection/disconnection of a wired cable is replaced with detection of connection/disconnection of a link.

Further, in the above-described exemplary embodiments, the case is described where the communication parameters of a wireless LAN are set. However, other wireless communication methods, such as BLUETOOTH, UWB, etc. that would enable practice of the present invention are applicable.

Further, in the above-described exemplary embodiments, the digital camera 101 and the printer 201 are connected to each other. However, the present invention is not limited to these two devices, and any device, such as a digital copying device, a display, a television, a DVD player, etc. that would enable practice of the present invention is applicable.

As described the above, the exemplary embodiments of the present invention are seen to overcome the problem that, when one communication apparatus is connected to another communication apparatus for the purpose of transferring information to be outputted, information for carrying out a communication in a first communication unit is transferred as well.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application 2005-273715 filed on Sep. 21, 2005, which is hereby incorporated by reference herein in its entirety.

What is claimed is:

1. A communication apparatus comprising:
a wireless communication unit;
a wired communication unit;
a receiver unit configured to receive, from another communication apparatus via the wired communication unit, wireless communication parameters used for wireless communication by the wireless communication unit;
a detector unit configured to detect an image transfer between the communication apparatus and the another communication apparatus via the wired communication unit, a user instruction for start of the image transfer between the communication apparatus and the another communication apparatus via the wired communication unit or completion of the image transfer between the communication apparatus and the another communication apparatus via the wired communication unit;
a sensor configured to detect a disconnection of wired connection by the wired communication unit to the another communication apparatus; and
a setting unit configured to set automatically the wireless communication parameters received by the receiver unit in the communication apparatus for wireless communication by the wireless communication unit, if the disconnection of wired communication to the another communication apparatus is detected by the sensor before the image transfer via the wired communication unit, before the user instruction for the start of the image transfer via the wired communication unit or before the completion of the image transfer via the wired communication unit is detected by the detector unit, and not set automatically the wireless communication parameter received by the receiver unit in the communication apparatus, if the image transfer via the wired communication unit, the user instruction for the start of the image transfer via the wired communication unit or the completion of the image transfer via the wired communication unit is detected by the detector unit before the disconnection of wired connection to the another communication apparatus is detected by the sensor.

2. The communication apparatus according to claim 1, wherein the communication apparatus automatically receives the wireless communication parameters when the communication apparatus is connected to the another communication apparatus via the wired communication unit.

3. The communication apparatus according to claim 1, wherein the detector unit detects an instruction for outputting the data by a user.

4. The communication apparatus according to claim 1, further comprising a discard unit configured to discard the wireless communication parameter not automatically set by the setting unit.

5. The communication apparatus according to claim 1, further comprising an inquiry unit configured to inquire a user whether to set the wireless communication parameter in a case that the setting unit does not set automatically the wireless communication parameter, wherein the setting unit sets the wireless communication parameter in the communication apparatus according to the inquiry result by the inquiry unit.

6. A method of controlling a communication apparatus including a wireless communication unit and a wired communication unit, the method comprising:
receiving wireless communication parameters, from another communication apparatus via the wired communication unit, used for wireless communication by the wireless communication unit;
detecting a disconnection of wired connection by the wired communication unit to the another communication apparatus;
detecting an image transfer between the communication apparatus and the another communication apparatus via the wired communication unit, a user instruction for start of the image transfer between the communication apparatus and the another communication apparatus via the wired communication unit or completion of the image transfer between the communication apparatus and the another communication apparatus via the wired communication unit; and
setting automatically the wireless communication parameters received from the another communication apparatus via the wired communication apparatus for wireless communication by the wireless communication unit in the communication apparatus, if the disconnection of wired connection to the another communication apparatus is detected before the image transfer via the wired communication unit, before the user instruction for the start of the image transfer via the wired communication unit or before the completion of the image transfer via the wired communication unit is detected, and not setting automatically the wireless communication parameter received from the another communication apparatus via the wired communication unit in the communication apparatus, if the image transfer via the wired communication unit, the user instruction for the start of the image transfer via the wired communication unit or the completion of the image transfer is detected before the disconnection of wired connection to the another communication apparatus is detected.

7. The method according to claim 6, further comprising, inquiring a user whether to set the wireless communication parameters in a case that the wireless communication parameters is not set automatically, wherein the communication apparatus sets the wireless communication parameters in the communication apparatus according to the inquiry result.

8. A non-transitory computer-readable storage medium for storing computer-executable process steps for causing a computer to execute a method of controlling a communication apparatus including a wireless communication unit and a wired communication unit, the method comprising:
receiving wireless communication parameters, from another communication apparatus via the wired communication unit, used for wireless communication by the wireless communication unit;
detecting a disconnection of wired connection by the wired communication unit to the another communication apparatus;
detecting the image transfer between the communication apparatus and the another communication apparatus via the wired communication unit, a user instruction for start of an image transfer between the communication apparatus and the another communication apparatus via the wired communication unit or completion of the image transfer between the communication apparatus and the another communication apparatus via the wired communication; and
setting automatically the wireless communication parameters received from the another communication apparatus via the wired communication apparatus for wireless communication by the wireless communication unit in the communication apparatus, if the disconnection of wired connection to the another communication apparatus is detected before the image transfer via the wired communication unit, before the user instruction for the start of the image transfer via the wired communication unit or before the completion of the image transfer via the wired communication unit is detected, and not setting automatically the wireless communication parameter received from the another communication apparatus via the wired communication unit in the communication apparatus, if the image transfer via the wired communication unit, the user instruction for the start of the image transfer via the wired communication unit or the completion of the image transfer is detected before the disconnection of wired connection to the another communication apparatus is detected.

* * * * *